(12) United States Patent
Oren

(10) Patent No.: US 8,417,642 B2
(45) Date of Patent: Apr. 9, 2013

(54) ONLINE COMMERCIAL TRANSACTION SYSTEM AND METHOD OF OPERATION THEREOF

(75) Inventor: Yosi Oren, Misgav (IL)

(73) Assignee: Cork Group Trading Ltd., Road Town (VG)

( * ) Notice: Subject to any disclaimer, the term of this patent is extended or adjusted under 35 U.S.C. 154(b) by 0 days.

(21) Appl. No.: 11/662,552

(22) PCT Filed: Sep. 13, 2005

(86) PCT No.: PCT/IB2005/002713
§ 371 (c)(1),
(2), (4) Date: Jul. 10, 2008

(87) PCT Pub. No.: WO2006/030281
PCT Pub. Date: Mar. 23, 2006

(65) Prior Publication Data
US 2008/0301057 A1 Dec. 4, 2008

(30) Foreign Application Priority Data
Sep. 14, 2004 (GB) .................................. 0420409.5

(51) Int. Cl.
*G06F 21/00* (2006.01)
(52) U.S. Cl.
USPC ............................................ 705/64; 705/78
(58) Field of Classification Search .................... 705/26, 705/71, 72
See application file for complete search history.

(56) References Cited

U.S. PATENT DOCUMENTS

| 5,878,141 | A * | 3/1999 | Daly et al. ....................... 705/78 |
| 7,370,015 | B2 * | 5/2008 | Gvily .............................. 705/42 |
| 7,574,486 | B1 * | 8/2009 | Cheng et al. .................. 709/219 |
| 2002/0108057 | A1 | 8/2002 | Zhanhong Wu et al. |
| 2003/0005290 | A1 | 1/2003 | Fishman et al. |
| 2003/0051138 | A1 | 3/2003 | Maeda et al. |
| 2003/0233285 | A1 | 12/2003 | Liu et al. |
| 2004/0128241 | A1 | 7/2004 | Akama |
| 2005/0059412 | A1 | 3/2005 | Hosokawa |

FOREIGN PATENT DOCUMENTS
WO WO0231675 A1 4/2002

OTHER PUBLICATIONS

International Search Report and Written Opinion from International Application No. PCT/IB2005/002713, dated as of Sep. 6, 2006.

* cited by examiner

*Primary Examiner* — Calvin L Hewitt, II
*Assistant Examiner* — Khalif Muhammad
(74) *Attorney, Agent, or Firm* — McDonnell Boehnen Hulbert & Berghoff LLP

(57) ABSTRACT

A system (1) for conducting commercial transactions comprises an application server (2) that hosts a software application that can be accessed by users to conduct commercial transactions thereon, an application user database (7) of authorized users capable of accessing the application server (2), each authorized user in the application user database (7) being uniquely identifiable by means of corresponding login name and password, and a proxy server (10) communicable with the application server (2) and accessible by a plurality of registered users from respective mobile phones (9). The proxy server provides each one of the plurality of registered users with access to the application server (2) from that user's respective mobile phone (9). A proxy database (11) is associated with the proxy server (10), the proxy server (10) containing details of authorized user database (7) who are also registered to access the application (2) server through the proxy server from their respective mobile phones (9).

26 Claims, 10 Drawing Sheets

ONLINE COMMERCIAL TRANSACTION SYSTEM AND METHOD OF OPERATION THEREOF

FIELD OF THE INVENTION

This invention relates to a system for conducting online commercial transactions and, more specifically, but not exclusively, to a system for conducting online commercial transactions initiated from mobile platforms such as mobile telecommunication handsets, mobile phones and the like. The system extends to a method of operation of a system for conducting online commercial transactions initiated from mobile platforms.

BACKGROUND TO THE INVENTION

The use of mobile telecommunication devices, such as mobile phones, for voice and data communication has increased rapidly in recent years, and such rapid growth is expected to continue for the foreseeable future. Increasingly, such mobile telecommunication devices are not only being used for voice and data communication, but are also used for entertainment purposes, such as multimedia messaging, mobile gaming, and the like.

Current mobile phones are capable of running a number of different embedded application technologies, such as J2ME, Brew, Symbian, Linux and Windows Mobile, to name but a few. These application technologies provide suitable platforms for the development of a wide range of different applications for mobile telecommunication devices.

The Internet, which is all pervasive, provides a suitable platform for conducting business-to-business (B2B) and business-to-consumer (B2C) commercial transactions, particularly on the World Wide Web of the Internet. A large number of disparate commercial enterprises currently conduct B2C commercial transactions by means of the Internet. Examples of such commercial enterprises are retailers, such as Amazon™; auctioneers, such as eBay™; online casinos; sports betting entities; and stockbrokers, such as E-trade™.

As a result of the recent rapid growth in mobile telecommunication, a need has arisen to make existing web-based B2C commercial applications available from mobile phones. This is commonly achieved by converting an existing B2C website into a format that is supported by mobile phone browsers, such as WAP, which are inherently of restricted functionality relative to full-function Web browsers. Due to the inherent limitations of mobile phone browsers, it is often not possible to convert certain elements of existing B2C websites for use on WAP browsers, such as, for example, rich Flash components, Java applets and downloadable applications or interfaces. Further, mobile communication poses a security risk as transmission signals are susceptible to eavesdropping and interception, necessitating the introduction of additional security measures.

For this reason, in order to make existing B2C commercial applications available from mobile phones, it becomes necessary to create a more complex B2C application that is compatible both with legacy elements of the commercial application, as well as with small-sized mobile device displays. Such an approach is tedious and unnecessarily expensive. In particular, it becomes necessary to establish an authentication and security system that can be used on mobile phone browsers, yet remains compatible with that of the existing B2C website, which is time-consuming.

A B2C commercial application consists, typically, of an application server that executes a server software program, and at least one user access facility that communicates with the application server by means of a communication network such as the Internet, and that executes a client software program. The client software program receives requests and instructions from a user and transmits these to the application server along the communication network. The server software program generates responses corresponding to the received requests and transmits the responses back to the user access facility, where the client software program displays them to the user in an intelligible manner in the context of the commercial application. The client software program may either be downloaded and installed on the user station, or may consist of code that executes from within an Internet browser.

OBJECT OF THE INVENTION

It is an object of this invention to provide a system for conducting online commercial transactions, and a method of operation thereof that will, at least partially, alleviate the abovementioned difficulties and disadvantages.

It is a further object of this invention to provide an authentication and security system for online commercial transactions conducted from mobile platforms, and a method of authenticating users in online commercial transactions initiated from mobile platforms that will, at least partially, alleviate the abovementioned difficulties and disadvantages.

SUMMARY OF THE INVENTION

In accordance with this invention there is provided a system for conducting commercial transactions, comprising:
an application server operable to host a software application for performing commercial transactions;
an application user database of authorised users capable of accessing the application server to conduct commercial transactions thereon, each authorised user in the application user database being uniquely identifiable by means of corresponding user information;
a proxy server communicable with the application server and accessible by a plurality of registered users from respective mobile access terminals, the proxy server being operable to provide each one of the plurality of registered users with access to the application server from that user's respective mobile access terminal; and
a proxy database of authorised users in the application user database who are also registered to access the application server through the proxy server from their respective mobile access terminals, each registered user in the proxy database being uniquely identifiable by means of a corresponding user identification code, the proxy database providing, for each registered user, a mapping of that user's user identification code and the user's corresponding user information contained in the application user database.

Further features of the invention provide for the proxy database to store each registered user's corresponding user information in encrypted format, for system to include an encryption engine capable of encrypting any data passed between the proxy server and the mobile access terminal of each registered user, for the proxy database to also store an active encryption key for each registered user, the active encryption key being used by the encryption engine to encrypt and decrypt data passed between the proxy server and the user's mobile access terminal, for the encryption engine to be dynamic, using a different encryption key during each session in which the user accesses the application server from his respective mobile access terminal, for the encryption engine to generate, during each session, a further encryption key for the user and to transfer the further encryption key to the user's mobile access terminal for storage therein, and for the encryption engine to automatically cause the stored further encryption key to become the active encryption key in a next session in which the user accesses the application server from the mobile access terminal.

Still further features of the invention provide for the mobile access terminal to be a mobile telephone having a corresponding telephone number, for the user information to be the a login name and password, for the proxy server to serve a mobile registration form accessible by the user to register for access to the application server from the user's respective mobile telephone, for the registration form to be served as either one or both an HTTP page accessible by means of a full-function web browser, and a WAP page accessible by means of a reduced-function browser, for the mobile registration form to require the user to submit a login name and password, a telephone number of the mobile phone from which the user wishes to access the application server, and a selected login PIN, for the proxy server to transfer the submitted login name and password to the application server for validation against the user's login name and password already stored in the application user database, for the proxy server to allocate a user identification code to the user and to generate an encryption key when the user's name and password have been successfully validated by the application server, for the proxy server to combine the user identification code and the encryption key as a two-part validation code and to transfer the validation code to the users mobile phone, for the proxy server to authenticate the user as a function of re-entry of the transferred validation code by the user in the registration form, for the proxy server to encrypt the user's login name and password, following user authentication, using a function of the user's selected login PIN code as an encryption key, and for the proxy server to store the encrypted user name and password in the proxy database by user identification code.

Yet further features of the invention provide for the user to initiate access to the application server by entering his login PIN on the mobile phone, for the mobile phone to encrypt the login PIN using the active encryption key, to prefix the encrypted login PIN with the user identification code and to transfer the prefixed, encrypted login PIN to the proxy server, for the proxy server to retrieve the active encryption key from the proxy database as a function of the prefixed user identification code, for the proxy server to decrypt the encrypted login PIN using the retrieved active encryption key, for the proxy server to retrieve the user's encrypted login name and password from the proxy database, to decrypt the encrypted login name and password using a function of the user's decrypted login PIN as an encryption key, and to transfer the user's decrypted login name and password to the application server to effect a login, for the mobile phone to encrypt any application data with the active encryption key and to prefix the encrypted application data with the user identification code prior to transferring the encrypted application data to the proxy server, and for the proxy server to decrypt the encrypted application data using the active encryption key and to transfer the decrypted application data to the application server for processing.

There is also provided for the system to enable a user to register at least one payment instrument to pay for purchases made on the application server, for the at least one payment instrument to be a debit card or a credit card, for the user to register the at least one payment instrument by entering on the mobile phone data relating to the payment instrument, together with a purchase PIN and the user's login name and password, for the proxy server to transfer the entered payment instrument data to the application server, for the application server to utilise the transferred payment instrument data to validate the payment instrument by means of a payment gateway, for the proxy server to encrypt the validated payment instrument data using a function of the purchase PIN as an encryption key, and for the proxy server to store the encrypted, validated payment instrument data in the proxy database.

There is further provided for the system to enable a user to utilise a previously registered payment instrument to pay for a purchase made on the application server, for the proxy server to transmit to the mobile phone for display thereon encrypted data relating to all payment instruments previously registered by the user, for the mobile phone to decrypt the received payment data and to display on the mobile phone the decrypted data relating to all the previously registered payment instruments as a menu, for the user to select from the menu a desired one of the previously registered payment instruments to be used for payment and to enter a value of the purchase together with the user's purchase PIN, for the mobile access terminal to encrypt the entered data using the active encryption key and to transfer the encrypted data to the proxy server, for the proxy server to obtain the user's active encryption key from the proxy database and to decrypt the transferred data using the retrieved active encryption key, and for the proxy server to transfer the encrypted data to the application server to settle payment for the purchase transaction.

The invention extends to a method of operation of a system for conducting commercial transactions, comprising the steps of:

hosting, on an application server, a software application for performing commercial transactions;

compiling an application user database of authorised users capable of accessing the application server to conduct commercial transactions thereon and uniquely identifying each authorised user in the application user database by means of corresponding user information;

providing a proxy server communicable with the application server and accessible by a plurality of registered users from respective mobile access terminals, the proxy server being operable to provide each one of the plurality of registered users with access to the application server from that user's respective mobile access terminal; and establishing a proxy database of authorised users in the application user database who are also registered to access the application server through the proxy server from their respective mobile access terminals, and uniquely identifying each registered user in the proxy database by means of a corresponding user identification code; and determining, for each registered user in the proxy database, a mapping of that user's user identification code and the user's corresponding user information contained in the application user database.

There is further provided for the method to include the further step of storing each registered user's corresponding user information in the proxy database in encrypted format, for encrypting any data passed between the proxy server and the mobile access terminal of each registered user, for also storing in the proxy database an active encryption key for each registered user, the active encryption key being used to encrypt and decrypt data passed between the proxy server and the user's mobile access terminal, for dynamically encrypting any data passed between the proxy server and the mobile access terminal of each registered user by using a different encryption key during each session in which the user accesses the application server from his respective mobile access terminal, for generating, during each session, a further encryption key for the user and transferring the further encryption key to the user's mobile access terminal for storage therein, and for automatically causing the stored further encryption key to become the active encryption key in a next session in which the user accesses the application server from the mobile access terminal.

There is still further provided for using a mobile telephone as a mobile access terminal, the mobile telephone having a corresponding telephone number, for using a login name and password as the user information, for causing the proxy server to serve a mobile registration form accessible by the user to register for access to the application server from the user's respective mobile telephone, for serving the registration form as either one or both an HTTP page accessible by means of a full-function web browser, and a WAP page accessible by means of a reduced-function browser, for requiring the user to submit, in the mobile registration form, a login name and password, a telephone number of the mobile phone from which the user wishes to access the application server, and a selected login PIN, for transferring the submitted login name and password from the proxy server to the application server for validation against the user's login name and password already stored in the application user database, for allocating a user identification code to the user and generating an encryption key when the user's name and password have been successfully validated by the application server, for combining the user identification code and the encryption key as a two-part validation code and transferring the validation code to the user's mobile phone, for authenticating the user as a function of re-entry of the transferred validation code by the user in the registration form, for encrypt the user's login name and password at the proxy server, following user authentication, using a function of the user's selected login PIN code as an encryption key, and for storing the encrypted user name and password in the proxy database by user identification code.

There is yet further provided for initiating access to the application server by entering a login PIN on the mobile phone, for encrypting the login PIN on the mobile phone using the active encryption key, for prefixing the encrypted login PIN with the user identification code and transferring the prefixed, encrypted login PIN to the proxy server, for retrieving the active encryption key from the proxy database as a function of the prefixed user identification code, for decrypting at the proxy server the encrypted login PIN using the retrieved active encryption key, for retrieving the user's encrypted login name and password from the proxy database, decrypting the encrypted login name and password using a function of the user's decrypted login PIN as an encryption key, and transferring the user's decrypted login name and password to the application server to effect a login, for encrypting at the mobile phone any application data with the active encryption key and prefixing the encrypted application data with the user identification code prior to transferring the encrypted application data to the proxy server, and for decrypting at the proxy server the encrypted application data using the active encryption key and transferring the decrypted application data to the application server for processing.

There is also provided for enabling a user to register at least one payment instrument to pay for purchases made on the application server, for registering the at least one payment instrument by entering on the mobile phone data relating to the payment instrument, together with a purchase PIN and the user's login name and password, for transferring the entered payment instrument data to the application server, for utilising the transferred payment instrument data to validate the payment instrument by means of a payment gateway, for encrypting on the proxy server the validated payment instrument data using a function of the purchase PIN as an encryption key, and for storing the encrypted, validated payment instrument data in the proxy database.

There is further provided for enabling a user to utilise a previously registered payment instrument to pay for a purchase made on the application server, for transferring encrypted data relating to all payment instruments previously registered by the user from the proxy server to the mobile phone for display thereon, for decrypting at the mobile phone the received payment data and displaying thereon the decrypted data relating to all the previously registered payment instruments as a menu, for selecting from the menu a desired one of the previously registered payment instruments to be used for payment and entering a value of the purchase together with the user's purchase PIN, for encrypting at the mobile access terminal the entered data using the active encryption key and transferring the encrypted data to the proxy server, for obtaining the user's active encryption key from the proxy database and decrypting the transferred data using the retrieved active encryption key, and for transferring the encrypted data from the proxy server to the application server to settle payment for the purchase transaction.

BRIEF DESCRIPTION OF THE DRAWINGS

A preferred embodiment of the invention is described below, by way of example only, and with reference to the abovementioned drawings, in which.

DETAILED DESCRIPTION OF THE INVENTION

Figure 1:
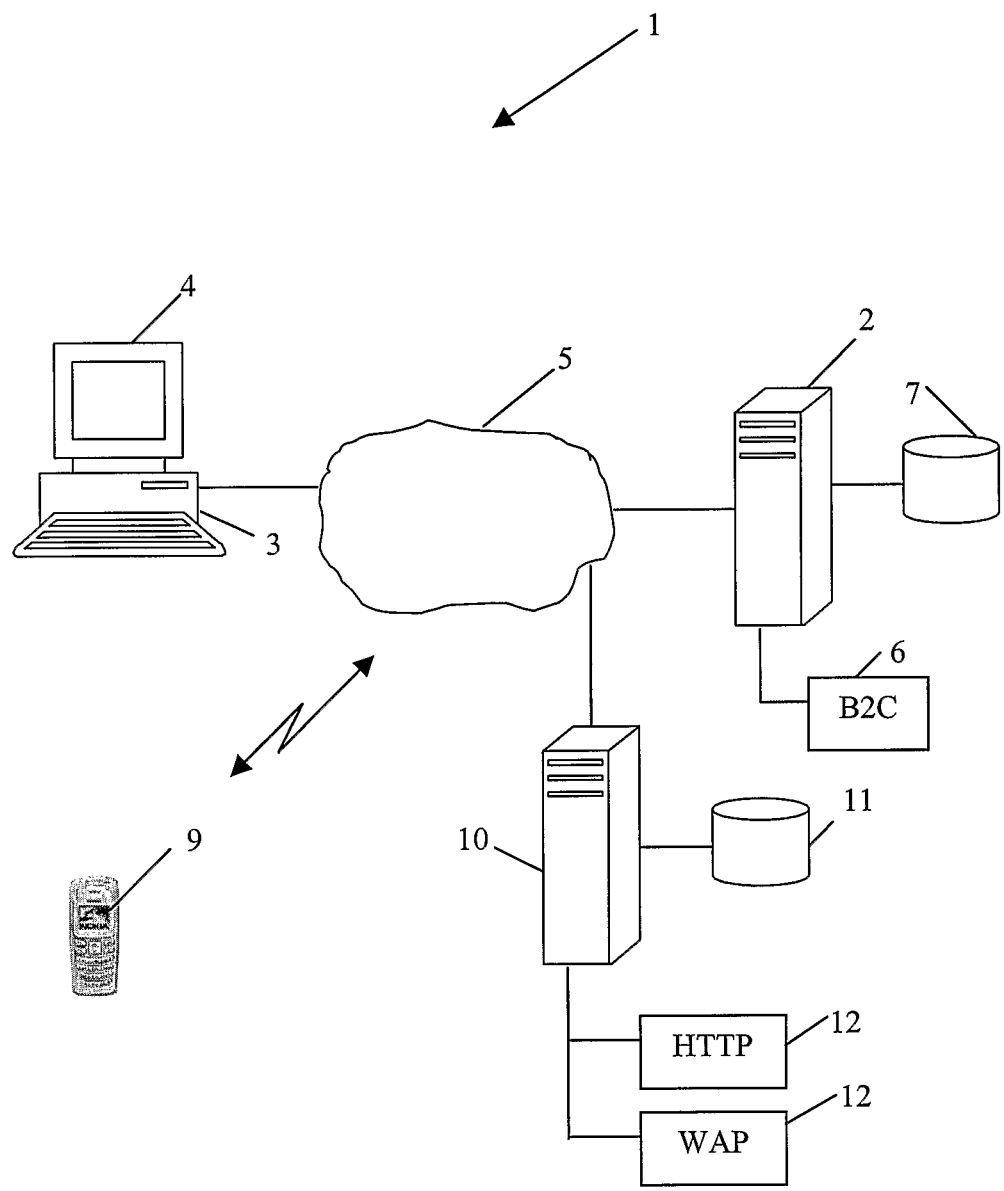
FIG. 1 is a functional representation of a system for conducting online commercial transactions, according to the invention.

Referring to FIGS. 1 to 5, in which like features of the invention are indicated by like numerals, a system for conducting online commercial transactions is indicated generally by reference numeral (1). This embodiment of the invention will be described with particular reference to commercial transactions that involve the purchase and redemption of credit and the placement of wagers on games of chance offered by an online casino. It is to be clearly understood, however, that the use of the invention is not limited to this particular application, but extends also to its use in other types of online commercial transactions.

As illustrated in FIG. 1, the system (1) includes an application server (2) that is accessible from at least one user access facility in the form of a computer workstation (3) remote from the application server. The computer workstation (3), which has an associated display (4), communicates with the application server (2) by means of a communication network (5) that is, in this embodiment, the Internet. The application server (2) hosts a B2C website (6) that is accessible by a user, from the computer workstation (3), by means of a full-function Internet Web browser such as, for example, Microsoft Internet Explorer or Mozilla Firefox. These particular web browsers are well known and commercially available from the Microsoft Corporation of Redmond, Wash., USA and the Mozilla Foundation of California, USA, respectively.

The B2C website (6) provides the user with access to a commercial application in the form of an online casino that offers one or more games of chance for play by the user. The computer workstation (3) executes one or more client software programs, each of which simulates the progress of a different game of chance. The generic operation of the client software programs will be described in more detail in the description that follows.

The application server (2) includes a random event generator (not shown) in the form of a computer program that is executable to generate random events upon which the outcome of any one of the games of chance is based. As an illustration, one of the client software programs on the computer workstation (3) simulates a game of roulette and, in this instance, the random event generation program (not shown) is executable to select, on a random basis, an integer between 0 and 36 that is displayed by the client software program on the display (4) as a simulation of a rotating roulette wheel coming to a standstill and a counter-rotating ball coming to rest at a corresponding one of 37 demarcated positions on the roulette wheel. As a further illustration, another one of the client software programs simulates a game of draw poker and the random event generation program is executable to generate five random integers between 1 and 52 that are rendered to the user by the corresponding client software program, on the display, as five playing cards making up a particular hand of poker.

A player wishing to use the system (1) and the B2C website (6) to perform commercial transactions such as, for example, purchasing credit, placing a wager on a turn of any one of the games of chance, and cashing out accumulated credit, is first required to register as an authorized user and to create an account on the application server (2). In order to register, the user is required to complete a registration form (not shown) that is displayed to the user as part of the B2C website. The registration form requires the user to furnish personal particulars such as, for example, name, residential address, date of birth and e-mail address. Once the user has completed the form, the application server (2) assigns a specific login name to the user and prompts the user to select a private password. The data pair consisting of the user's login name and password will, for convenience, be referred to in this specification as the User Information. The application server (2) stores the User Information away in an application user database (7) associated with the application server (2). Once registered in this manner, the user is an authorised and is free to use the online casino B2C application by merely entering his User Information again when accessing the B2C website (6).

It will be appreciated by those skilled in the art that the system (1) as described above enables any user having an Internet-enabled computer workstation (3) to register on the application server (2) by means of the B2C website and to use the underlying online casino application on the application server (2) to conduct commercial, that is, gaming-related, transactions. Furthermore, the computer workstation (3) can be a desktop computer, a laptop computer or a handheld computer ("PDA") capable of Internet access by means of a wired or a wireless network.

In order to provide access to the B2C application from a mobile telecommunication device such as a mobile phone (9), the system (1) includes a proxy server (10) having an associated proxy database (11). The proxy server (10) is communicable with the application server (2) by means of the Internet, and hosts a proxy website (12) which is accessible by the user in order to register to access the B2C application from the mobile phone (9). The mobile phone (9) is Internet-enabled, preferably by means of communication standards such as General Packet Radio Service ("GPRS") or Universal Telephone Mobile Service ("UMTS"), which are both well known in the art. The proxy website (12) is available to the user in either one or both of a Hypertext Transfer Protocol ("HTTP") version or a Wireless Application Protocol ("WAP") version. Additionally, the proxy website (12) may also be available in Hypertext Transfer Protocol (Secure) ("HTTPS") format for secure transactions, if required. In order to register for mobile access to the B2C application, the user must first be registered on the application server (2) and the user's User Information must already be stored in the application user database (7).

It is desired to permit users to access the B2C application from mobile phones (9) without necessitating any modification of the B2C application itself and of any subsystem thereof, such as a user identification and security subsystem (not shown). This objective is achieved by interposing the proxy server (10) as an intermediary element between the mobile phone (9) and the application server (2), with all data received by the proxy server from the mobile phone being relayed by the proxy server to the application server and vice versa, and without having to transfer the User Information between a mobile phone and the proxy server over the air.

Registration for Mobile Use

Figure 2A:
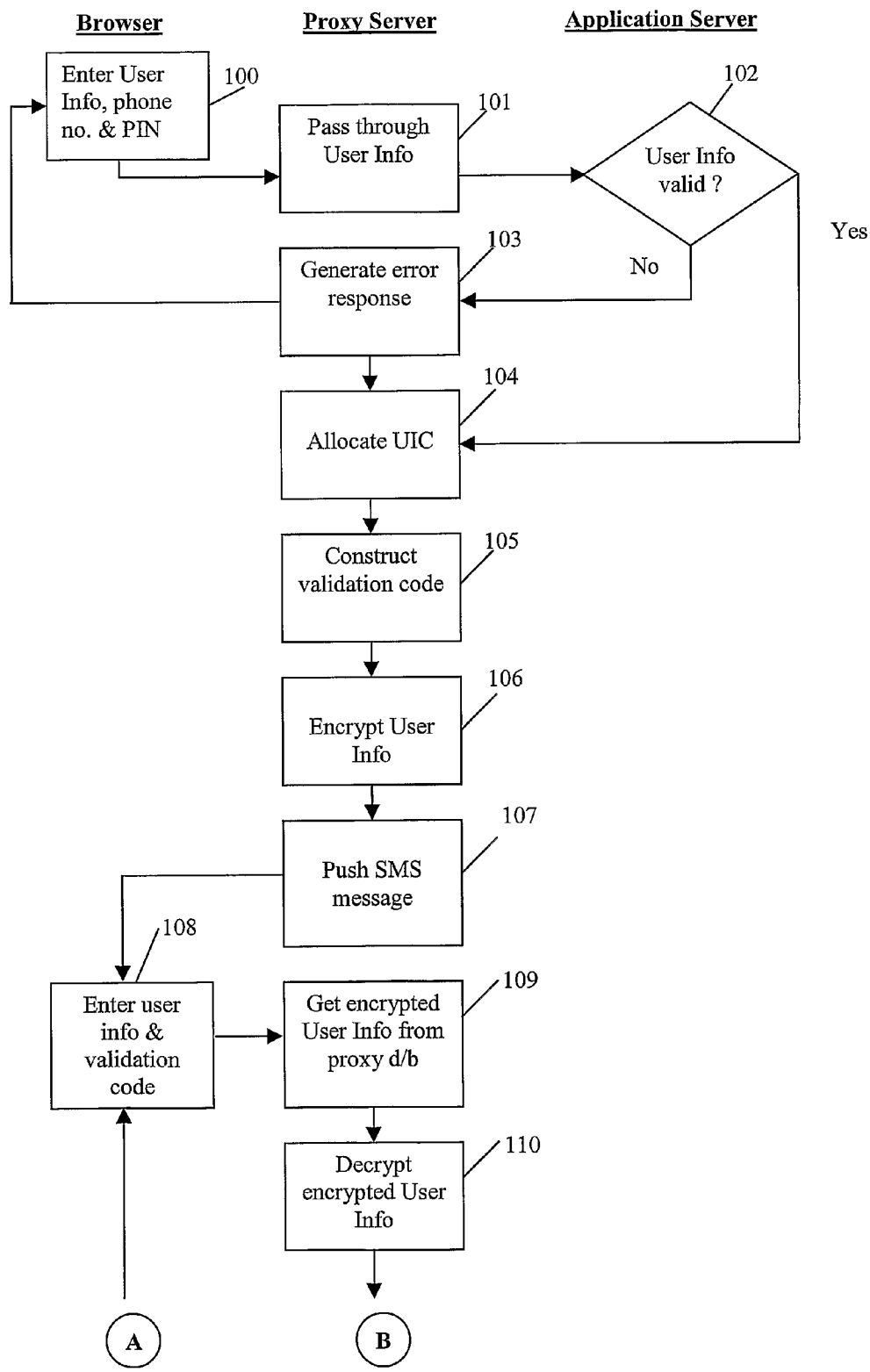
FIGS. 2A and 2B are flow charts of a registration process to enable use of the system of FIG. 1 from a mobile phone.
Figure 2B:
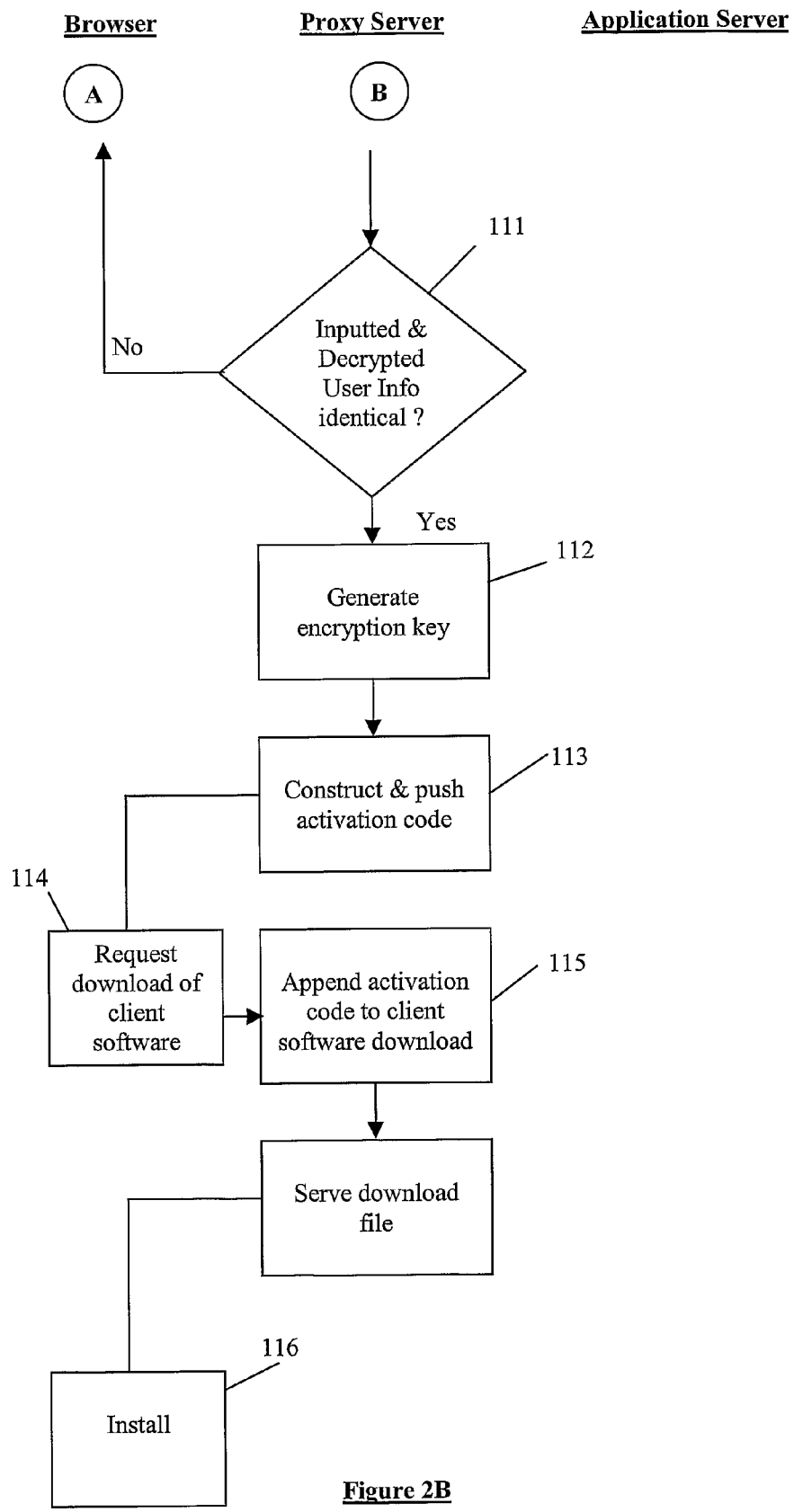
Figure 3A:
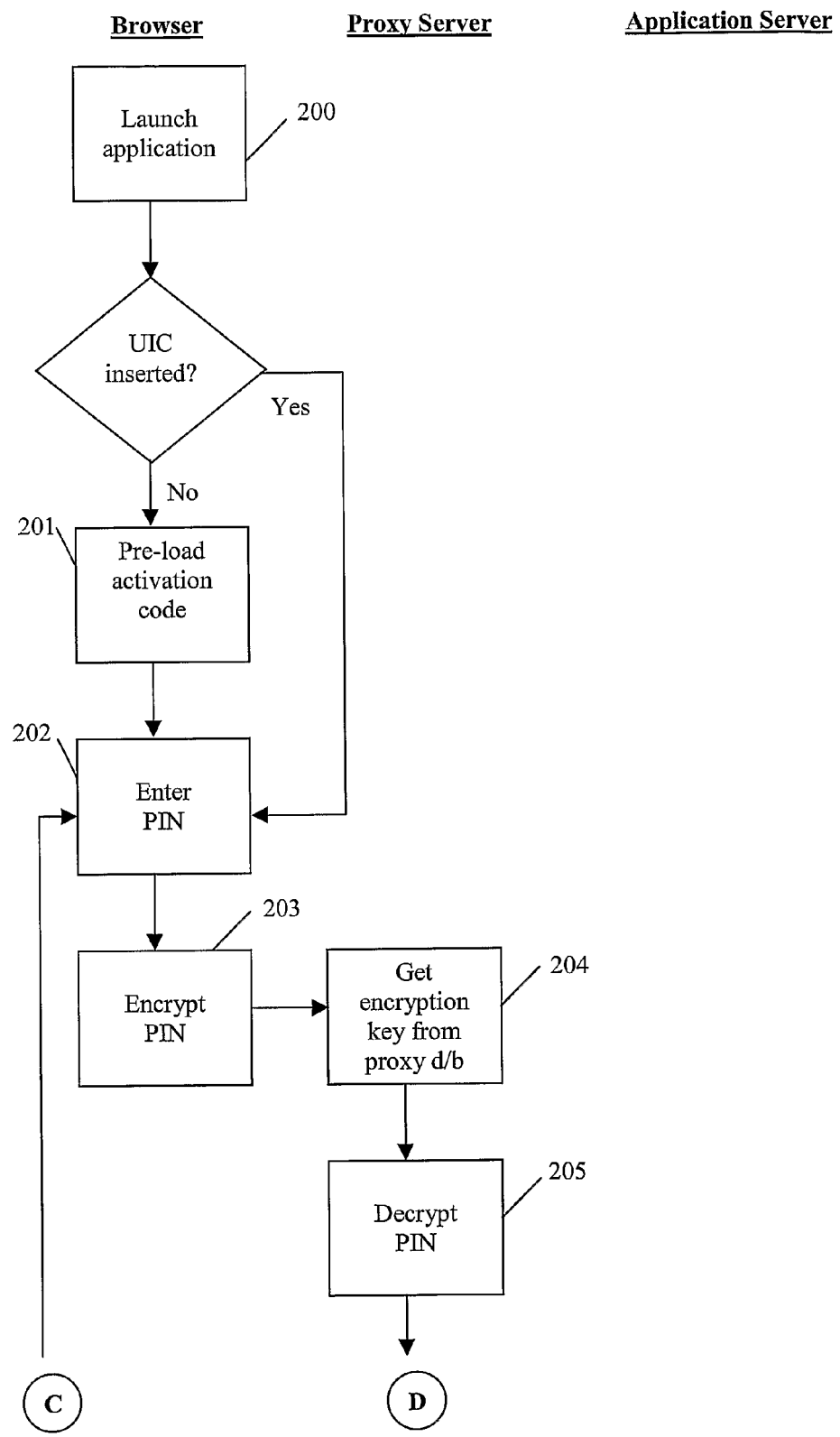
FIGS. 3A, 3B, 3C and 3D are flow charts of a login process to enable use of the system of FIG. 1 from a mobile phone.
Figure 3B:
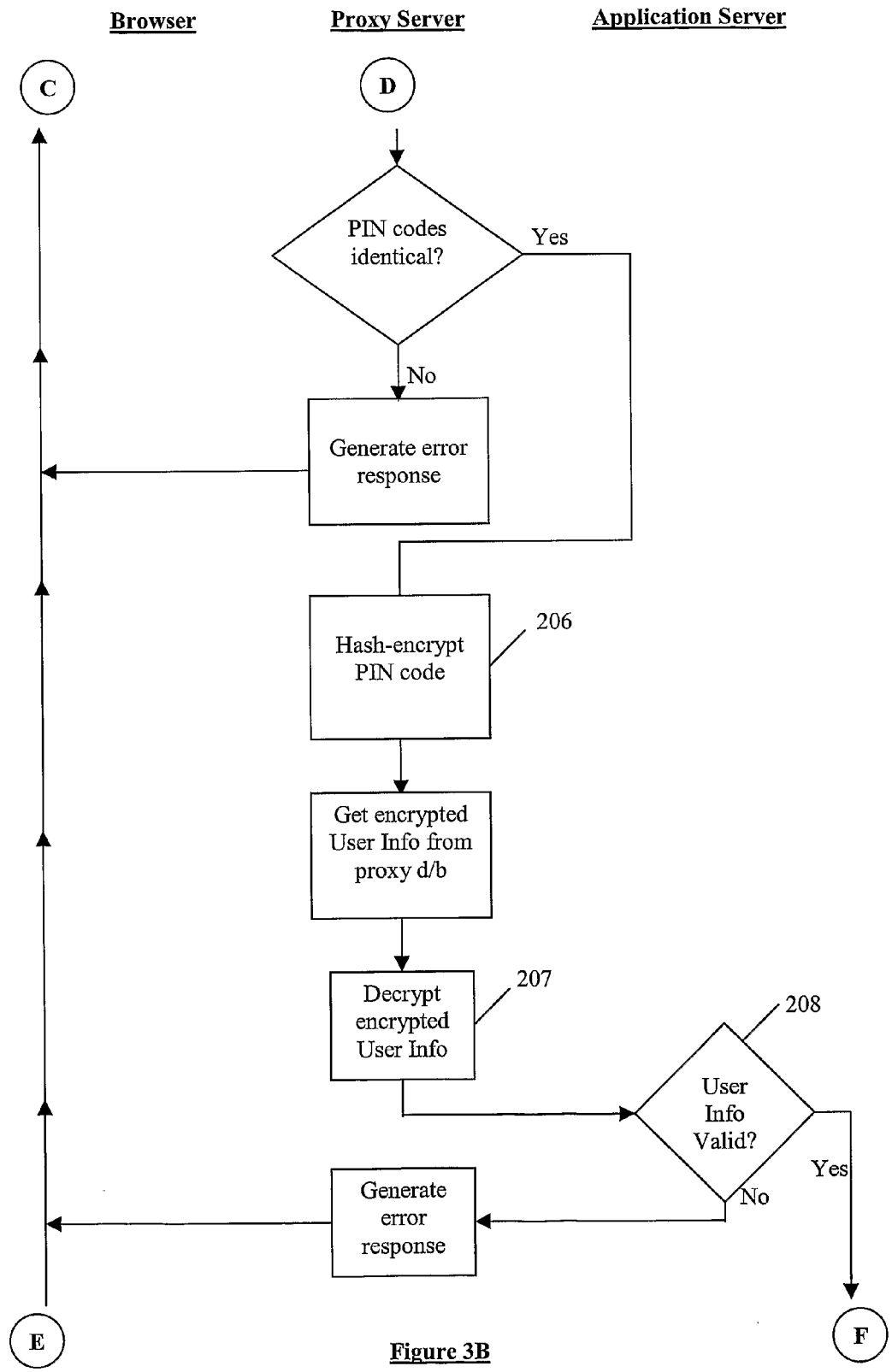
Figure 3C:
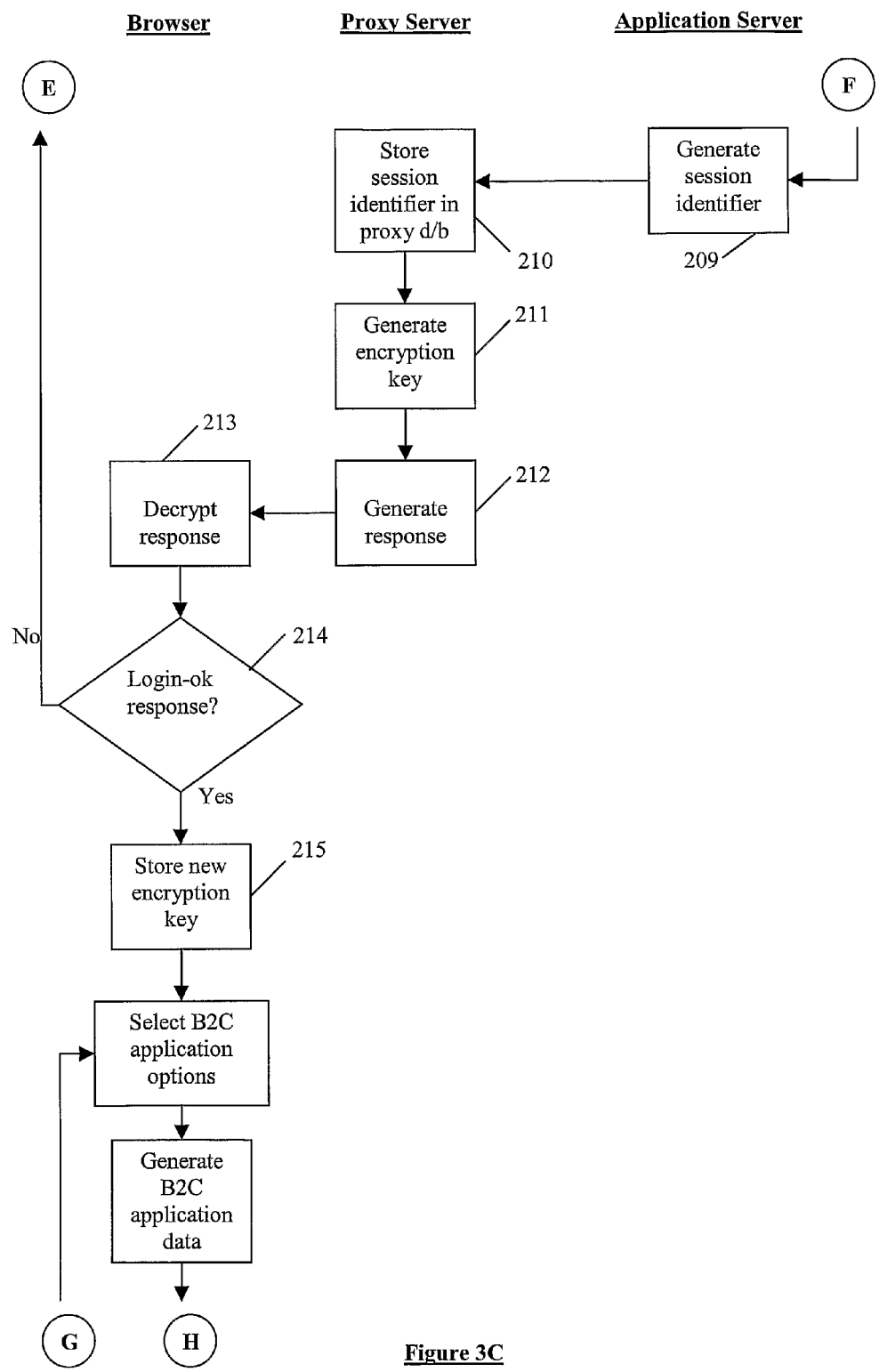
Figure 3D:
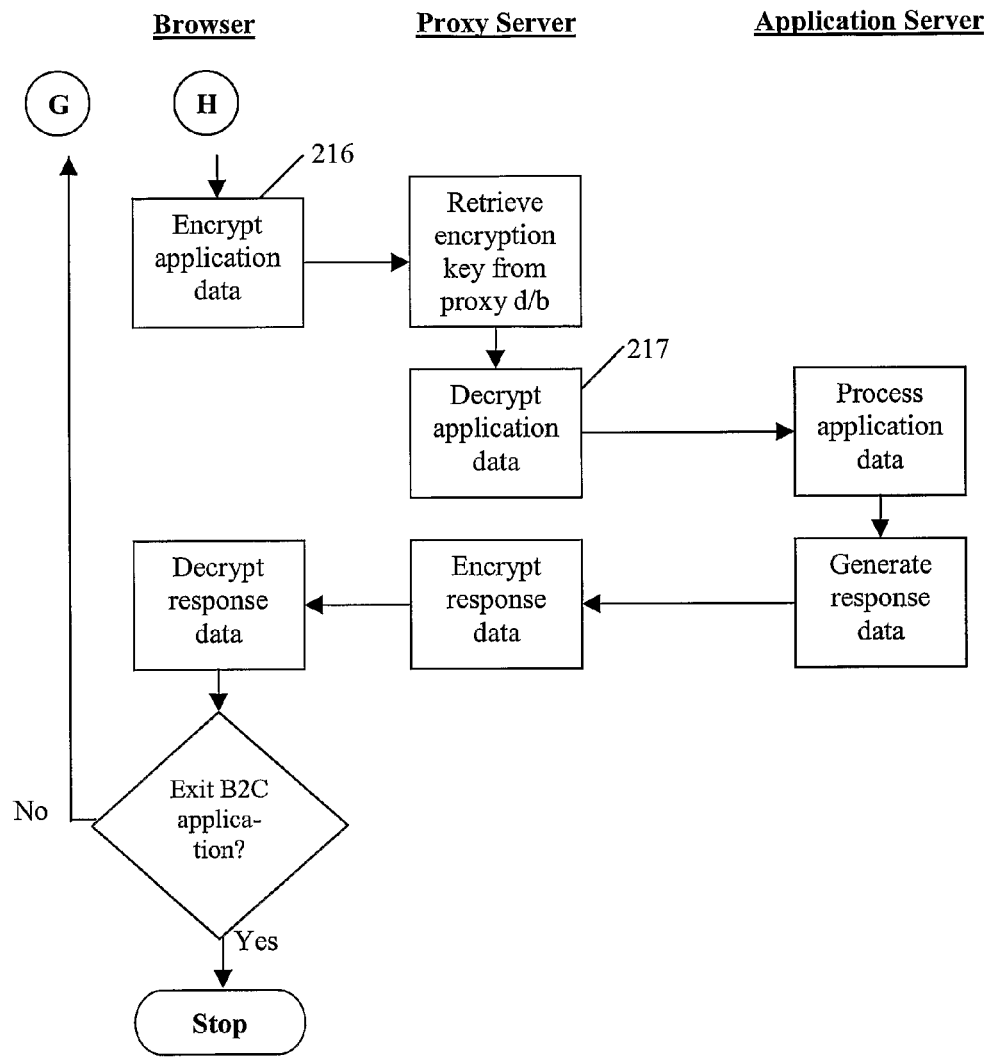

The registration process is described hereunder with reference to FIGS. 2A and 2B. In order to register for mobile access to the B2C application, a user selectively accesses either the HTTP version or the WAP version of the proxy website (12) by means of either the computer workstation (3) or the mobile phone (9), respectively. The proxy website (12) presents to the user a mobile registration form (not shown) in which the user is required to enter, at step 100, his User Information, that is, username and password as previously registered on the application server (2), together with the following additional information:

1. a telephone number of the mobile phone (9) from which access to the B2C application is desired; and
2. a user-selected Personal Identification Number ("login PIN code") in a format that is convenient for entering on a keypad of the mobile phone (9) such as, for example, a 4-digit numeric code.

The proxy server (10) passes, at step 101, the User Information on to the application server (2), which checks the validity of the User Information against the contents of the application user database (7), as indicated by step 102. The application server (2) then notifies the proxy server (10) whether the User Information has been found to be valid or invalid. If the User Information is invalid, the proxy server (10) generates an error response at step 103 and displays an error message to the user on the proxy website (12). If the User Information is found to be valid, the mobile registration proceeds to the next stage, in which the proxy server (10):

first allocates, at step 104, a user identification code ("UIC") to the user and stores the UIC in the proxy database (11);

then constructs a validation code, at step 105, in the form of a two-part code separated by a separator character that is, in this embodiment a 'hyphen' character. The first part of the validation code is the UIC, while the second part of the validation code is a four-character encryption code that is automatically generated by the proxy server (10) and stored away in the proxy database (11), indexed by UIC; and also encrypts, at step 106, the login PIN code and the User Information using a HASH function of the four-character encryption code as an encryption key.

In order to ascertain that the user who is using the mobile phone (9) is, in fact, the same user that registered on the application server (2), a message conforming to the well known Short Message Service ("SMS") standard is pushed, at step 107, to the telephone number of the mobile phone (9) provided by the user in step 100 above. The pushed message includes the validation code as constructed by the proxy server (10), as well as a hyperlink address.

If the user is registering for mobile access from the computer workstation (3) via the HTTP version of the proxy website (12), he is merely required to enter the validation code contained in the pushed message into the mobile registration form in order to complete the mobile registration process. If, on the other hand, the user is registering from the WAP version of the proxy website (12) by means of the mobile phone (9), the user is required to activate the hyperlink contained in the pushed message, which causes the WAP browser on the mobile phone (9) display a new registration form on the phone. The user is then required to re-enter, at step 108, his User Information once more in this registration form, together with the validation code. In this part of the registration process, the proxy server (10):

1. uses the UIC contained in the first portion of the validation code as an index to retrieve the user's encrypted User Information from the proxy database (11) at step 109;
2. then decrypts the user's encrypted User Information from the proxy database (11), using the inputted validation code as an encryption key, at step 110;
3. compares, at step 111, the decrypted User Information with the inputted User Information;
4. transmits an error response for display to the user in the user's browser if the decrypted and inputted User information is not identical; and
5. stores the inputted User Information securely in the proxy database (11) if the decrypted and inputted User Information is identical.

It will be appreciated by those skilled in the art that the above procedure of: generating the validation code, encrypting the User Information and storing it in the proxy database (11), pushing the validation code to the mobile phone (9), requiring the user to re-enter the User Information and the pushed validation code, using the re-entered validation code to decrypt the stored, encrypted User Information from the proxy database, and comparing the decrypted User Information with the re-entered User Information is both necessary and sufficient to ensure that the user who is has requested mobile access to the B2C application is indeed the same user that registered on the application server (2).

Once the correct identity of the registrant has been verified as outlined above, the proxy server (10):

1. generates automatically, at step 112, a 16-character encryption key and stores the encryption key in the proxy database (11). The proxy server (10) uses the UIC as an index to locate the encryption key in the proxy database (11) that corresponds to the user;
2. constructs, at step 113, a two-part activation code in which the two parts are separated by a separator character, in this embodiment a "hyphen" character. The first part of the activation code is the UIC as allocated to the user by the proxy server (10) and which is stored in the proxy database (11), while the second part of the activation code is the 16-character encryption key generated in step 112;
3. encrypts the User Information using a Hash function of the user-selected PIN as an encryption key and stores the encrypted user information in the proxy database (11) indexed by UIC; and
4. pushes a WAP message to the mobile phone (9) that contains an acknowledgement that the decrypted and re-entered User Information is identical, a download link to a dedicated web page from which a mobile client software program associated with the B2C application can be downloaded to the mobile phone (9), and the activation code generated in step 113 above for the mobile client software program;

The 16-character encryption key as contained in the second part of the activation code will become an active key used to encrypt application data that is sent by the mobile phone (9) to the proxy server (10) during the user's first session in which he accesses the B2C application from the mobile phone (9). The operation of the 16-character encryption key will be described in greater detail in the description that follows.

After receipt of the pushed WAP message, the user accesses the dedicated web page to request, at step 114, a download of the mobile client software program. The proxy server (10) appends, at step 115, the activation code to the download file to ensure that the user does not have to enter the activation code on the keypad of the mobile phone (9), which can be tedious and time-consuming. It will be appreciated by those skilled in the art that the activation code acts as a unique identifier that is injected into the mobile client software program download and that is unique to that specific B2C application and to that specific user.

Once downloaded from the proxy server (10), the mobile client software program can be installed on the mobile phone (9), at step 116, and the B2C application is then ready to be accessed by the user. Installation of the mobile client software program results in an application icon (not shown) being displayed on the mobile phone (9). The function of the mobile client software program is analogous to that of the client software program on the computer workstation (3) described above, namely, in this embodiment, to simulate the progress of a game of chance offered by the online casino.

Application Login

The application login process is described with reference to FIGS. 3A to 3D. The user launches the mobile client software program by activating the corresponding application icon (not shown) on the mobile phone (9) at step 200. Activation of the application icon (not shown) for a first time after registration for mobile use of the B2C application causes an application splash screen to be displayed on the mobile phone (9). Pressing of any key on the mobile phone (9) causes the splash screen to be replaced by a form having a field in which the user must enter the activation code. In order to assist the user, this field displays, at 201, the proxy server-generated activation code, which the user is merely required to confirm. After the application code has been confirmed, the user is required to enter, at step 202, his pre-selected 4-digit PIN by means of a keypad (not shown) associated with the mobile phone (9).

In the description that follows, the 16-character encryption key that forms the second part of the activation code will be referred to, for convenience, as the "active encryption key".

The mobile client software program installed on the mobile phone (9) encrypts, at 203, the user-entered PIN, together with game-specific function calls, using the active encryption key. The mobile phone (9) prefixes the encrypted PIN with the UIC and the separator character and transmits the result as a packet to the proxy server (10). The proxy server (10) strips the UIC from the packet and uses the UIC as an index to retrieve, at 204, the user's corresponding encryption key from the proxy database (11), which is identical to the active encryption key on the mobile phone (9) as a result of a successful completion of the registration for mobile use process described in the previous section. The proxy server (10) then decrypts, at step 205, the encrypted PIN received from the mobile phone (9), using the retrieved active encryption key. The resulting decrypted PIN code is HASH-encrypted at step 206 and the result is used as a new encryption key to decrypt, at 207, the user's corresponding encrypted User Information (that is, the user's login name and password) which stored in the proxy database (11). The proxy server (10) transmits the decrypted User Information to the application server (2) to effect a user login transaction to the B2C application at step 208.

If the user login transaction is successful, the application server (2) obtains a session identifier from the B2C application, at step 209, and returns the session identifier to the proxy server (10). The proxy server (10) stores the session identifier in the proxy database (11), at step 210, and transmits an encrypted response to the mobile phone (9), which is constructed as follows:

1. the proxy server (10) encrypts a 'Login-OK' confirmation using the user's active encryption key stored in the proxy database (11);
2. the proxy server (10) generates a new 16-character encryption key, at step 211, and stores it in the proxy database (11) under the user's UIC; and
3. the new encryption key is itself encrypted using the active encryption key and is concatenated, at 212, with the "Login-OK" confirmation described in paragraph 1.) above.

The concatenated string constitutes the response to the login transaction performed by the user on the mobile phone (9).

The mobile client software program on the mobile phone (9) decrypts the response to the login transaction, at step 213, using the active encryption key. If the mobile client software program detects the "Login-OK" response, at step 214, the new 16-character encryption key contained in the response is stored, at 215, in non-volatile memory (not shown) on the mobile phone (9), together with the UIC, as a new activation key. This new encryption key will become the active encryption key for the user's next session of the B2C application. During the user's next session, a further new encryption key will be sent to the mobile phone (9) in the same manner for use in the user's subsequent session, and so on, recursively.

Once the login phase of the commercial transaction has been successfully completed as described above, any application data that is to be transmitted by the mobile phone (9) to the application server (2) is first encrypted, at step 216, with the active encryption key for the current session on the application server. The encryption key for the user's next session on the application server (2), which will already have been stored on the mobile phone (9) lies dormant and unused until the user initiates the next session on the application server, which could be after a considerable period of time. In this manner, the activation code acts as an ongoing encryption key for the transfer of application data to the proxy server (10).

The encrypted application data is appended to the UIC and transmitted by the mobile phone (9) to the proxy server (10) for decryption. Once received by the proxy server (10), the data is decrypted, at 217, and converted and processed for passing to the application server (2) as conventional web-style parameters as if the user had interacted directly with the B2C application on the application server, without the presence of the proxy server (10).

Registration to Purchase

Figure 4:
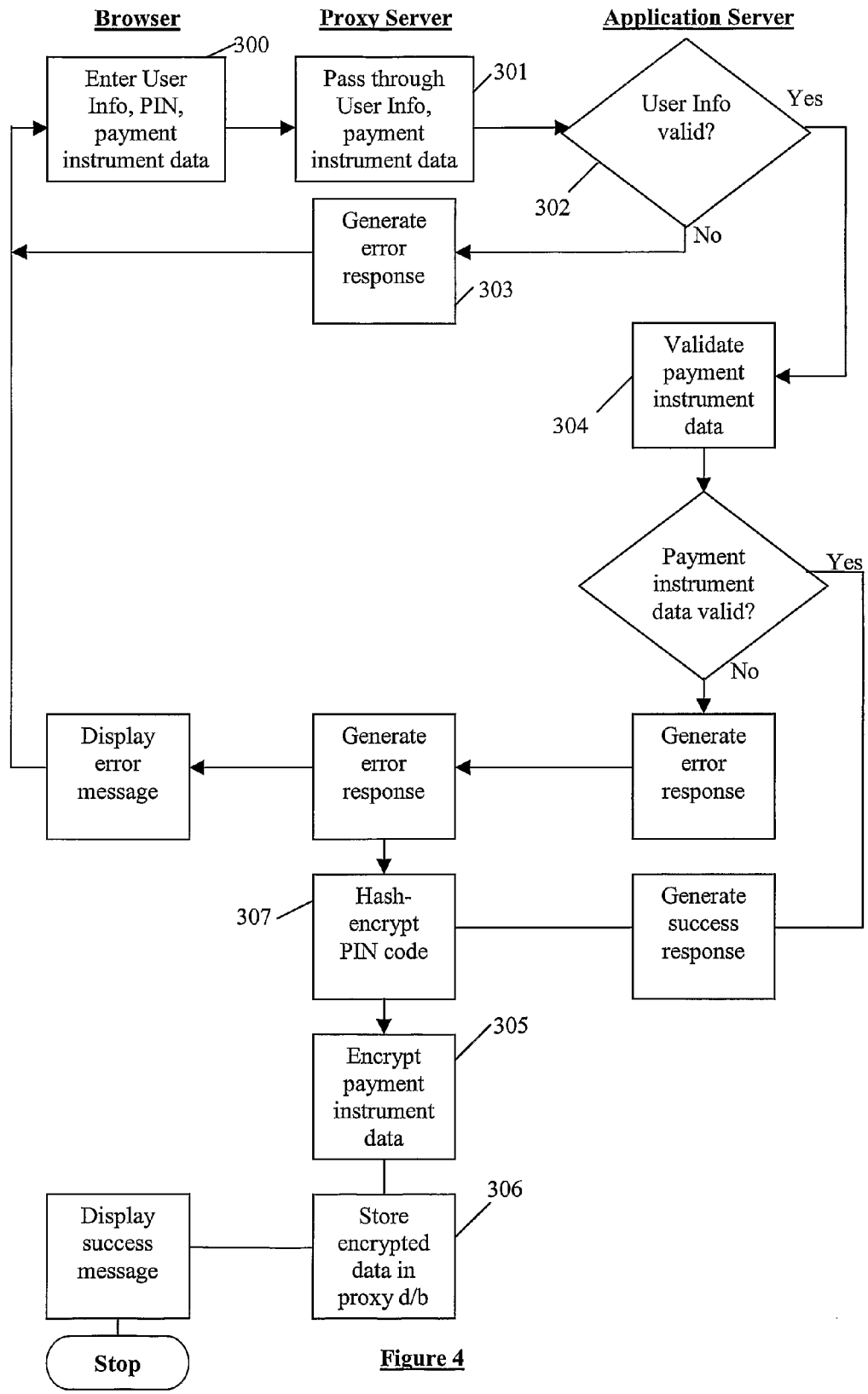
FIG. 4 is a flow chart of a payment instrument registration process for the system of FIG. 1, performed from a mobile phone.

The registration to purchase process is described with reference to FIG. 4. A common transaction that will be performed by most authorized users on the B2C application is a purchasing transaction to purchase goods and/or services. In the current embodiment, the user performs a purchasing transaction in order to acquire credit in order to place wagers on any of the games of chance offered by the online casino.

In order to purchase goods or services, the user is first required to pre-register one or more payment instruments, such as credit cards, debit cards and the like, one at a time. This registration can be accomplished from an HTTP, a WAP or, more commonly, an HTTPS page, in which the user is required to enter, at step 300, his User Information, together with data relating to the desired payment instrument such as, for example, a credit card number, a credit card type, a payment currency and a billing address. The user is also required to select and enter a purchase PIN code, in particular, a four-digit numeric code that is convenient to enter from the keypad of the mobile phone (9).

The proxy server (10) passes, at step 301, the User Information to the application server (2), which checks the validity of the User Information against the contents of the application user database (7), as represented in step 302. When validity check of the User Information has been completed, the application server (2) notifies the proxy server (10) whether the User Information has been found to be valid or invalid. If the User Information is invalid, the proxy server (10) generates an error response at step 303 and displays an error to the user on the HTTP or WAP page. If the User Information is found to be valid, the payment registration proceeds to the next stage in which:

the application server (2) validates, at 304, the purchase instrument with a payment gateway (not shown); and if the purchase instrument is validated by the payment gateway (not shown) the payment instrument data is encrypted by the proxy server (10) at step 305, and stored in the proxy database (11), at 306. The payment instrument data supplied by the user is encrypted, at step 307, using a Hash function of the user-selected purchase PIN code.

It will be appreciated that the user may register more than one payment instrument and may utilise any registered payment instrument to effect payment in a particular purchase transaction.

Purchase Transaction

Figure 5A:
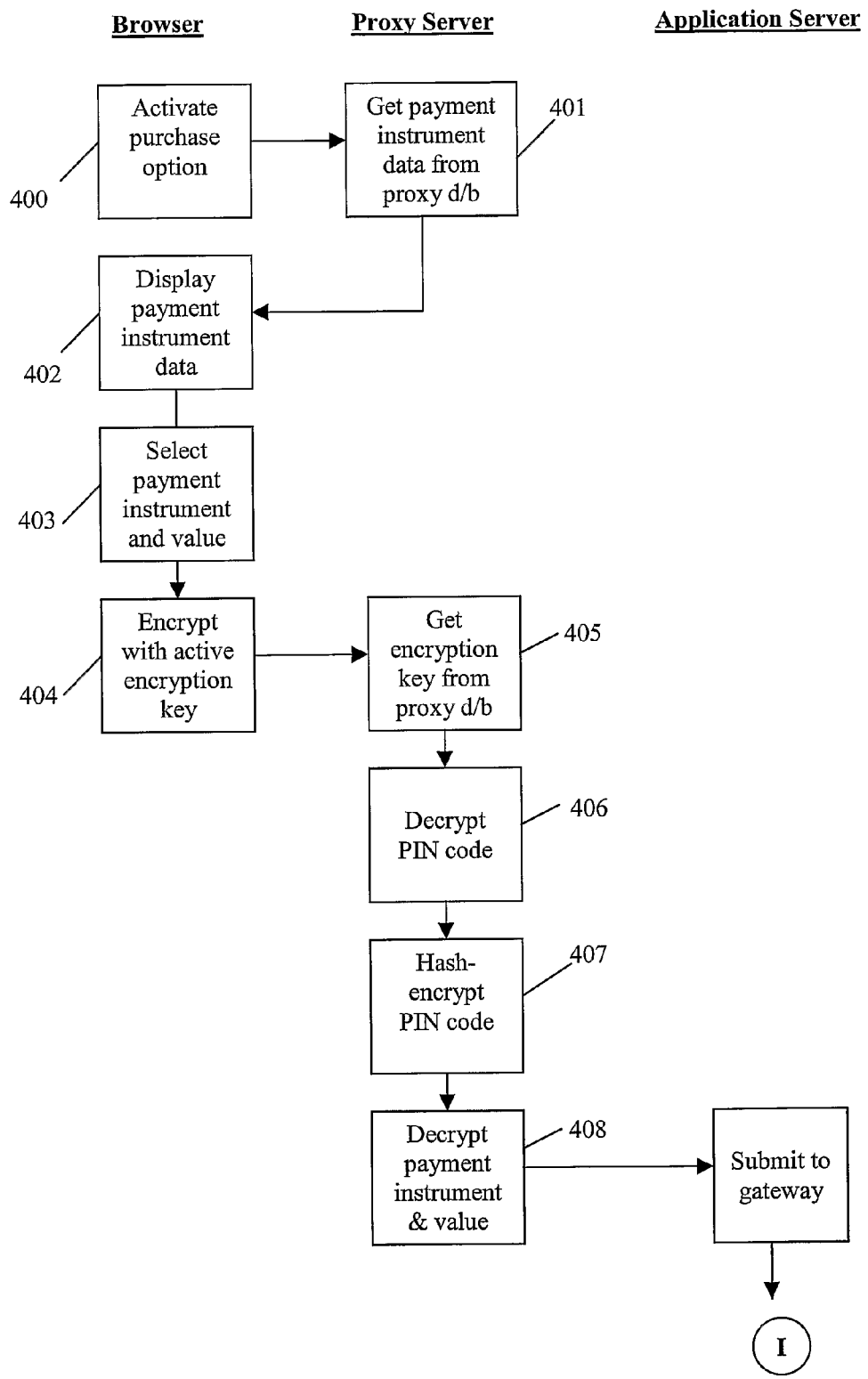
FIGS. 5A and 5B are flow charts of a purchase transaction on the system of FIG. 1, conducted from a mobile phone.
Figure 5B:
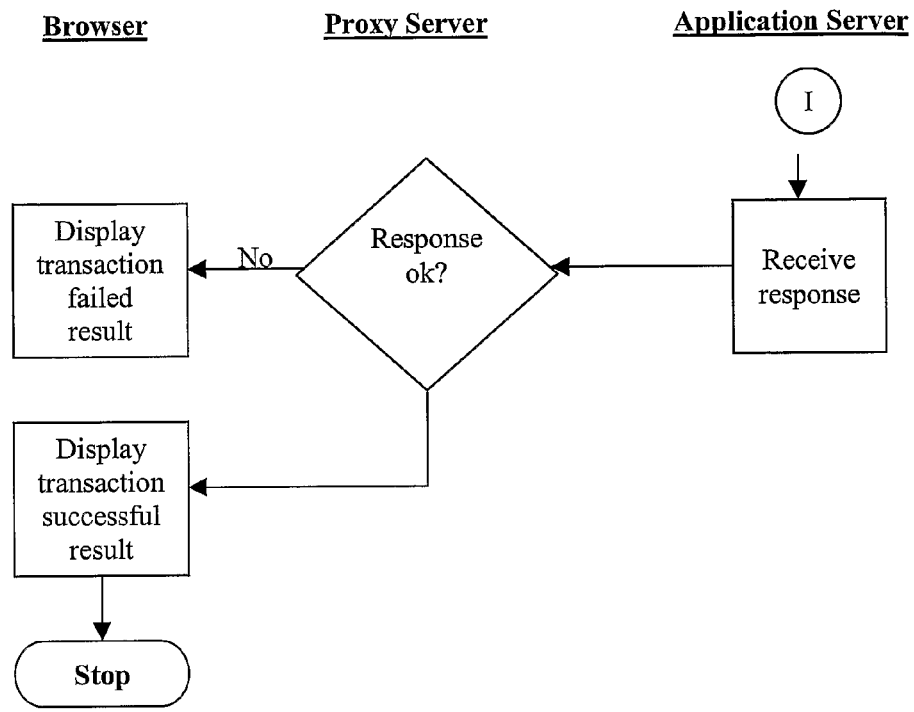

The purchase transaction is described with reference to FIGS. 5A and 5B. Once the player has launched the mobile client software program by activating the application icon (not shown) on the mobile phone (9) and successfully logged in to the B2C application on the application server (2), the user may select, from an application menu, an option for purchasing, as illustrated in step 400. The mobile application software program phone (9) transmits a purchasing request, encrypted with the active encryption key and prefixed with the UIC, to the proxy server (10). The proxy server (10) then, in turn, decrypts the purchasing request using the active encryption key obtained from the proxy database (11) and retrieves, at 401, the encrypted payment instrument data relating to all the user's previously-registered payment instruments and returns this data to the mobile phone (9). The received payment instrument data is decrypted by the mobile client software program on the mobile phone (9) and is then presented, at step 402, to the user as a menu of all the payment instruments that are available to the user.

The user is prompted to select a preferred payment instrument from those listed in the menu, to enter a purchase amount, and to enter his purchase PIN, as shown in step 403. This user-entered data, together with an identifier for a purchase transaction, is encrypted, at 404, using the active encryption key and prefixed with the UID and the separator character, as described above, before being transmitted to the proxy server (10). Upon receiving the user-entered data, the proxy server (10) strips out the UIC and uses this to retrieve the user's active encryption key from the proxy database (11), as illustrated in step 405. The received data is decrypted, at 406, using the active encryption key retrieved from the proxy database (11). The decrypted purchase PIN is Hashed, at 407, and the result is used to decrypt the encrypted payment instrument data corresponding to the preferred payment instrument selected by the user to pay for the purchase, which is stored in the proxy database (11), as shown in step 408. The proxy server (10) then forwards the decrypted preferred payment instrument data and the decrypted purchase amount to the application server (2) where it is used to complete an online payment, usually by means of a payment gateway, in a manner that is well-known in the art and that will not, for this reason, be described here in detail.

It will be appreciated by those skilled in the art of the invention that all communication between the mobile phone (9) and the proxy server (10) is encrypted. Further, communication between the proxy server (10) and the application server (2) does not require any changes to be made to the application server (2), leaving the legacy application on the application server unaltered.

During the registration for mobile use, the system (1) verifies that the user is the same person as one who is registered on the application user database (7) as an authorized user of the B2C application. The proxy server (10) encrypts the user's login name and password and stores them in the proxy database (11), thus enabling the user to login to the application server (2) without having to re-enter the login name and password and to transmit the login name and password over the air-only the user's pre-selected PIN is necessary to effect the login. The PIN code selected by the user, as part of the registration process, constitutes the only piece of information that will be required for subsequent access to the B2C application from the mobile phone (9);

The proxy server (10) downloads a unique, personalized, version of the B2C application to the user's mobile phone (9), which is subsequently installed on mobile phone, the B2C application being personalised by means of an embedded activation code that serves as a dynamic encryption engine for ongoing, secure transfer of data from the mobile phone to the proxy server (10), and from there to the application server (2).

It will be further appreciated by those skilled in the art that the use of a proxy server and a proxy database (11) in a manner described above does not require any changes or modifications to be made to the application server (2) or the application user database (7) in order to access the B2C application from the mobile phone (9). This characteristic enables existing B2C applications to be migrated to mobile telecommunication devices without affecting existing backend legacy systems.

Numerous modifications are possible to this embodiment without departing from the scope of the invention. In particular, communication between the proxy server (10) and the application server may also be encrypted, such as when HTTPS is used for secure communication. Further, the downloading of the mobile client software program may take place, not from the proxy server (10), but rather from a separate download server (not shown) that is in communication with the proxy server, thereby decoupling the download and communication intermediary functions of the download server.

Still further, the commercial application may be a business-to-business ("B2B") application as opposed to a B2C application.

Yet further, the system (1) can also allow multiple B2C and B2B applications to be downloaded and installed on the mobile phone (9), each commercial application having a corresponding application icon (not shown). In this particular variation of the invention, the proxy server (10) stores in the proxy database (11) an encryption key and a user-selected PIN corresponding to each one of the multiple B2C and B2B applications installed on the mobile phone (9). Each B2C and B2B application will have a different UIC, since each application does not have to co-operate with the same proxy server (10). In this topology, each B2C and B2B application will embed a different proxy server address. Additionally, each proxy server (10) may use a different proxy database (11), or all proxy servers may utilise a common proxy database. Similarly, the multiple B2C and B2B applications may be served by the same application server (2), or may be served by different application servers.

The invention therefore provides a system for performing mobile commercial transactions that provides secure user access from mobile telecommunication devices by means of a simplified login procedure. The system does not require modification of legacy backend systems.

The invention claimed is:

1. A method, comprising:
a proxy server apparatus serving a mobile registration form to a browser-enabled device to register a user's mobile device for mobile access to an application hosted on an application server apparatus, wherein the mobile registration form provides for entry of user information comprising a login name and password, a telephone number of the user's mobile device, and a login personal identification number (PIN);
the proxy server apparatus receiving from the browser-enabled device the mobile registration form with the user information, telephone number, and login PIN entered therein; the proxy server apparatus transferring the user information to the application server apparatus for validation; the proxy server receiving a notification from the application server apparatus that the user information is valid and, in response, allocating a user identification code to the user, generating an encryption code, constructing a validation code from the user identification code and encryption code, and transferring the validation code to the user's mobile device; the proxy server apparatus receiving the validation code and user information in a resubmitted mobile registration form from the browser-enabled device; the proxy server apparatus verifying the user based on the validation code and user information in the re-submitted mobile registration form; and in response to verifying the user, the proxy server apparatus generating an encryption key, storing the encryption key in a proxy database indexed by the user identification code, constructing an activation code from the user identification code and encryption key, encrypting the user information using the login PIN, storing the encrypted user information in the proxy database indexed by the user identification code, and transferring to the user's mobile device (i) a link from which a mobile client software program associated with the application can be downloaded and (ii) the activation code.

2. The method of claim 1, wherein the browser-enabled device uses a full function web browser, and wherein the mobile registration form is served by the proxy server apparatus using the Hypertext Transfer Protocol (HTTP).

3. The method of claim 1, wherein the browser-enabled device uses a reduced function web browser, and wherein the mobile registration form is served by the proxy server apparatus using the Wireless Application Protocol (WAP).

4. The method of claim 3, wherein the browser-enable device is the user's mobile device.

5. The method of claim 1, wherein the proxy server apparatus verifying the user based on the validation code and user information in the re-submitted mobile registration form comprises: retrieving the encrypted user information from the proxy database; decrypting the encrypted user information; and comparing the decrypted user information with the user information received in the resubmitted mobile registration form.

6. The method of claim 1, further comprising: the proxy server apparatus receiving a request to download the mobile client software program; and in response to the request, the proxy server apparatus downloading the mobile client software program for installation on the user's mobile device.

7. The method of claim 6, further comprising: the proxy server apparatus receiving a login request from the user's mobile device, wherein the login request comprises (i) the login PIN, which has been encrypted using the encryption key from the activation code, and (ii) the user identification code.

8. The method of claim 7, further comprising: the proxy server apparatus using the user identification code in the login request to retrieve the encryption key from the proxy database; the proxy server apparatus using the retrieved encryption key to decrypt the encrypted login PIN; the proxy server apparatus using the decrypted login PIN to decrypt the encrypted user information stored in the proxy database; and the proxy server apparatus transmitting the decrypted user information to the application server apparatus to request a user login to the application.

9. The method of claim 8, further comprising: in response to the user login being successful, the proxy server receiving a session identifier for a current session of the application, generating a new encryption key for a next session of the application, storing the new encryption key in the proxy database indexed by the user identification code, and transmitting the new encryption key to the user's mobile device.

10. The method of claim 9, further comprising: after effecting a successful user login to the application, the proxy server apparatus receiving application data from the user's mobile device, wherein the application data has been encrypted using a current encryption key for a current session of the application; the proxy server apparatus decrypting the encrypted application data using the current encryption key; and the proxy server apparatus transferring the decrypted application data to the application server apparatus.

11. The method of claim 8, further comprising:
the proxy server apparatus receiving from the user's mobile device a request to register at least one payment instrument to pay for purchases made on the application server apparatus, wherein the request comprises data relating to the at least one payment instrument, a purchase PIN, and the user information; the proxy server apparatus transferring the payment instrument data and user information to the application server apparatus for validation; and in response to successful validation, the proxy server apparatus encrypting the payment instrument data using the purchase PIN and storing the encrypted payment instrument data in the proxy database.

12. The method of claim 11, further comprising: after effecting the user login to the application, the proxy server apparatus receiving an encrypted purchasing request from the user's mobile device; and in response to the encrypted purchasing request, the proxy server apparatus decrypting the encrypted purchasing request, retrieving the encrypted payment instrument data from the proxy database, and transferring the encrypted payment instrument data to the user's mobile device for presentation as a menu of payment instruments that are available to the user.

13. The method of claim 12, further comprising: the proxy server apparatus receiving an encrypted payment request from the user's mobile device, wherein the encrypted payment request comprises a selected payment instrument from the menu, a payment amount for a purchase made on the application server apparatus, and the purchase PIN; the proxy server apparatus decrypting the encrypted payment request; the proxy server apparatus decrypting, using the purchase PIN, the encrypted payment instrument data in the proxy database corresponding to the selected payment instrument; and the proxy server apparatus forwarding the decrypted payment instrument data and decrypted payment amount to the application server apparatus to pay for the purchase made on the application server apparatus.

14. A proxy server apparatus, wherein the proxy server apparatus is configured to perform functions comprising: the proxy server apparatus serving a mobile registration form to a browser-enabled device to register a user's mobile device for mobile access to an application hosted on an application server apparatus, wherein the mobile registration form provides for entry of user information comprising a login name and password, a telephone number of the user's mobile device, and a login personal identification number (PIN); the proxy server apparatus receiving from the browser-enabled device the mobile registration form with the user information, telephone number, and login PIN entered therein; the proxy server apparatus transferring the user information to the application server apparatus for validation; the proxy server receiving a notification from the application server apparatus that the user information is valid and, in response, allocating a user identification code to the user, generating an encryption code, constructing a validation code from the user identification code and encryption code, and transferring the validation code to the user's mobile device; the proxy server apparatus receiving the validation code and user information in a resubmitted mobile registration form from the browser-enabled device; the proxy server apparatus verifying the user based on the validation code and user information in the re-submitted mobile registration form; and in response to verifying the user, the proxy server apparatus generating an encryption key, storing the encryption key in a proxy database indexed by the user identification code,
constructing an activation code from the user identification code and encryption key, encrypting the user information using the login PIN, storing the encrypted user information in the proxy database indexed by the user identification code, and transferring to the user's mobile device (i) a link from which a mobile client software program associated with the application can be downloaded and (ii) the activation code.

15. The proxy server apparatus of claim 14, wherein the proxy server apparatus is configured to serve the mobile registration form to the browser-enabled device using the Hypertext Transfer Protocol (HTTP).

16. The proxy server apparatus of claim 14, wherein the proxy server apparatus is configured to serve the mobile registration form to the browser-enabled device using the Wireless Application Protocol (WAP).

17. The proxy server apparatus of claim 16, wherein the browser-enabled device is the user's mobile device.

18. The proxy server apparatus of claim 14, wherein the proxy server apparatus verifying the user based on the validation code and user information in the re-submitted mobile registration form comprises: retrieving the encrypted user information from the proxy database; decrypting the encrypted user information; and comparing the decrypted user information with the user information received in the resubmitted mobile registration form.

19. The proxy server apparatus of claim 14, wherein the functions further comprise: the proxy server apparatus receiving a request to download the mobile client software program; and in response to the request, the proxy server apparatus downloading the mobile client software program for installation on the user's mobile device.

20. The proxy server apparatus of claim 19, wherein the functions further comprise: the proxy server apparatus receiving a login request from the user's mobile device, wherein the login request comprises (i) the login PIN, which has been encrypted using the encryption key from the activation code, and (ii) the user identification code.

21. The proxy server apparatus of claim 20, wherein the functions further comprise: the proxy server apparatus using the user identification code in the login request to retrieve the encryption key from the proxy database; the proxy server apparatus using the retrieved encryption key to decrypt the encrypted login PIN; the proxy server apparatus using the decrypted login PIN to decrypt the encrypted user information stored in the proxy database; and the proxy server apparatus transmitting the decrypted user information to the application server apparatus to request a user login to the application.

22. The proxy server apparatus of claim 21, wherein the functions further comprise: in response to the user login being successful, the proxy server receiving a session identifier for a current session of the application, generating a new encryption key for a next session of the application, storing the new encryption key in the proxy database indexed by the user identification code, and transmitting the new encryption key to the user's mobile device.

23. The proxy server apparatus of claim 22, wherein the functions further comprise: after effecting a successful user login to the application, the proxy server apparatus receiving application data from the user's mobile device, wherein the application data has been encrypted using a current encryption key for a current session of the application; the proxy server apparatus decrypting the encrypted application data using the current encryption key; and the proxy server apparatus transferring the decrypted application data to the application server apparatus.

24. The proxy server apparatus of claim 21, wherein the functions further comprise: the proxy server apparatus receiving from the user's mobile device a request to register at least one payment instrument to pay for purchases made on the application server apparatus, wherein the request comprises data relating to the at least one payment instrument, a purchase PIN, and the user information; the proxy server apparatus transferring the payment instrument data and user information to the application server apparatus for validation; and in response to successful validation, the proxy server apparatus encrypting the payment instrument data using the purchase PIN and storing the encrypted payment instrument data in the proxy database.

25. The proxy server apparatus of claim 24, wherein the functions further comprise: after effecting the user login to the application, the proxy server apparatus receiving an encrypted purchasing request from the user's mobile device; and in response to the encrypted purchasing request, the proxy server apparatus decrypting the encrypted purchasing request, retrieving the encrypted payment instrument data from the proxy database, and transferring the encrypted payment instrument data to the user's mobile device for presentation as a menu of payment instruments that are available to the user.

26. The proxy server apparatus of claim 25, wherein the functions further comprise: the proxy server apparatus receiving an encrypted payment request from the user's mobile device, wherein the encrypted payment request comprises a selected payment instrument from the menu, a payment amount for a purchase made on the application server apparatus, and the purchase PIN; the proxy server apparatus decrypting the encrypted payment request; the proxy server apparatus decrypting, using the purchase PIN, the encrypted payment instrument data in the proxy database corresponding to the selected payment instrument; and the proxy server apparatus forwarding the decrypted payment instrument data and decrypted payment amount to the application server apparatus to pay for the purchase made on the application server apparatus.

* * * * *

UNITED STATES PATENT AND TRADEMARK OFFICE
CERTIFICATE OF CORRECTION

| | | Page 1 of 1 |
|---|---|---|
| PATENT NO. | : 8,417,642 B2 | |
| APPLICATION NO. | : 11/662552 | |
| DATED | : April 9, 2013 | |
| INVENTOR(S) | : Oren | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1791 days.

Signed and Sealed this
First Day of April, 2014

Michelle K. Lee
*Deputy Director of the United States Patent and Trademark Office*